N-HYDROXYALKYL-PIPERIDINE CARBOXYLIC ACIDS

Francis E. Cislak and Charles K. McGill, both of Indianapolis, Ind., assignors to Reilly Tar & Chemical Corporation, Indianapolis, Ind., a corporation of Indiana
No Drawing. Filed Apr. 10, 1964, Ser. No. 358,955
6 Claims. (Cl. 260—294)

Our invention relates to new compositions of matter and to the process of making them. More particularly, it relates to N-hydroxyalkyl-piperidine carboxylic acids, which compounds have the formula:

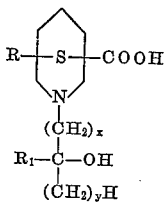

wherein R represents hydrogen, lower alkyl, or a carboxyl group, $R_1$ represents hydrogen or lower alkyl, $x$ is 1, 2, 3, or 4, $y$ is 0, 1 or 2.

In general, our new compounds may be prepared by the reaction of a chlorohydrin with a piperidine carboxylic acid. Some of them may be prepared by reacting an alkylene oxide with a piperidine carboxylic acid or with a salt of a piperidine carboxylic acid.

Our N-hydroxyalkyl-piperidine carboxylic acids are useful in the preparation of polyester resins. Thus, heating N-hydroxyethyl-isonipecotic acid brings about a self esterification to yield a resin whose molecular structure may be portrayed by the formula,

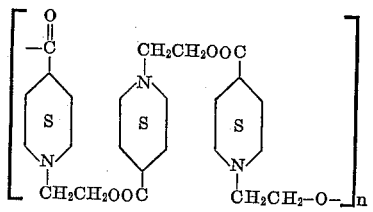

The polyesters made from our N-hydroxyalkyl-piperidine carboxylic acids are particularly advantageous to use in conjunction with glass fibers. The basin nitrogen in their molecular make-up enhances the adhesion to the acidic glass fibers.

The manner in which our invention may be carried out is described in the following specific examples. These examples are given by way of illustration only and are not to be construed as a limitation on our invention.

EXAMPLE 1

N-(beta-hydroxyethyl)isonipecotic acid

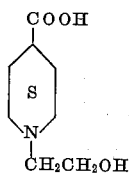

A solution of 151 grams of sodium isonipecotate in 500 grams of water is placed into a two-liter flask equipped with a stirrer and an inlet tube which extends below the surface of the solution. While stirring the solution, 44 grams of ethylene oxide is gradually added to the solution through the inlet tube; the ethylene oxide is added during a two-hour period in the form of a vapor obtained by warming the liquid ethylene oxide by means of a water bath. The temperature of the reaction mixture is maintained at about 25° C. The reaction may be conducted even at a lower temperature, such as 0° C., but the reaction proceeds satisfactorily and at a faster rate at temperatures in the range of 25–30° C. After all of the ethylene oxide has been added, the solution is stirred for about four more hours. Then the reaction mixture is neutralized with dilute sulfuric acid to a pH of 7. The solution now contains N-(beta-hydroxyethyl)isonipecotic acid, water and sodium sulfate.

The N-(beta-hydroxyethyl)isonipecotic acid may be isolated in several ways. One satisfactory manner of recovering the N-(beta-hydroxyethyl)isonipecotic acid consists in evaporating the reaction mixture to dryness on a steam bath. The resulting residue is extracted with hot methanol; the N-(beta-hydroxyethyl)isonipecotic acid dissolves in the hot methanol. Upon cooling the methanol solution, N-(beta-hydroxyethyl)isonipecotic acid crystallizes out. The crystals are separated by filtration and dried in an oven at about 100° C. The dried crystalline N-(beta-hydroxyethyl)isonipecotic acid melts at about 185° C.

Another satisfactory method of recovering the N-(beta-hydroxyethyl)isonipecotic acid from the neutral aqueous solution is by means of the ion exclusion technique. In this process the aqueous solution is passed over an ion exchange resin such as Dowex 50X8. The sodium sulfate is retained on the resin, the solution emerging consists of water and N-(beta-hydroxyethyl)isonipecotic acid. This solution is concentrated by evaporation, and the N-(beta-hydroxyethyl)isonipecotic acid which crystallizes out upon cooling the concentrated solution is removed by filtration and dried in an oven at a temperature of about 100° C.

EXAMPLE 2

N-(beta-hydroxyethyl)isonipecotic acid

A solution of 148 grams of calcium isonipecotate in 1360 grams of water is placed into a three-liter flask equipped with a stirrer and an inlet tube which extends below the surface of the solution. While stirring the solution, 44 grams of ethylene oxide is gradually added to the solution through the inlet tube; the ethylene oxide is added during a two-hour period in the form of a vapor obtained by warming the liquid ethylene oxide by means of a water bath. The temperature of the reaction mixture is maintained at about 25-30° C. After all of the ethylene oxide has been added, the reaction mixture is stirred for about an additional hour.

The solution now contains the calcium salt of N-(beta-hydroxyethyl)isonipecotic acid. Several ways may be used to recover the free-N-(beta-hydroxyethyl)isonipecotic acid from this solution. One convenient way is as follows. Carbon dioxide is added to the solution, preferably while heating it on a water bath, thereby causing the precipitation of calcium carbonate. When all the calcium carbonate is precipitated, the reaction mixture is filtered, thereby separating the calcium carbonate. The filtrate, which contains the N-(beta-hydroxyethyl)isonipecotate, is evaporated to dryness. The resulting N-(beta-hydroxyethyl)isonipecotate is pure enough to use for many purposes. If, however, a purer form is desired, the semi-pure material may be recrystallized from one part of methanol. The crystalline product as obtained contains a molecule of water of crystallization and has a melting point of about 160° C. Upon drying in an oven at about 100° C., the water of crystallization is removed and the dried N-(beta-hydroxyethyl)isonipecotic acid melts at about 185° C.

EXAMPLE 3

*N-(beta-hydroxyethyl)nipecotic acid*

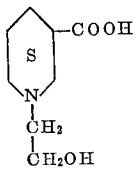

The procedure of Examples 1 and 2 is repeated with the exception that the sodium salt of nipecotic acid is used in place of the sodium salt of isonipecotic acid in Example 1 and the calcium salt of nipecotic acid is used in place of the calcium salt of isonipecotic acid in Example 2.

EXAMPLE 4

*N-(beta-hydroxyethyl)-6-methylnipecotic acid*

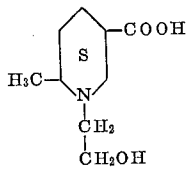

The procedure of Example 1 is used with the exception that 165 grams of the sodium salt of 6-methylnipecotic acid is used in place of the 151 grams of the sodium salt of isonipecotic acid.

EXAMPLE 5

*N-(beta-hydroxyethyl)-3,5-dicarboxypiperidine*

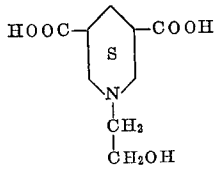

The procedure of Example 1 is repeated with the exception that 217 grams of the di-sodium salt of 3,5-dicarboxypiperidine is used in place of sodium salt of isonipecotic acid.

EXAMPLE 6

*N-(beta-hydroxyethyl)pipecolinic acid*

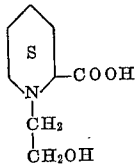

The procedure of Example 1 is repeated with the exception that the sodium salt of pipecolinic acid is used in place of the sodium salt of isonipecotic acid.

EXAMPLE 7

*N-(beta-hydroxypropyl)isonipecotic acid*

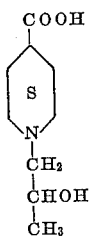

A solution of 64 grams of isonipecotic acid in 200 cc. of water is placed into a one-liter flask equipped with a stirrer and an inlet tube which extends below the surface of the solution. While stirring the solution, 29 grams of propylene oxide is added through the inlet tube during a period of about 40 minutes. The temperature of the reaction mixture is maintained at about 25° C.–30° C. After all of the propylene oxide has been added, the reaction mixture is stirred for about another three or four hours. The reaction mixture now contains water and N-(beta-hydroxypropyl)isonipecotic acid and any unreacted isonipecotic acid.

The N-(beta-hydroxypropyl)isonipecotic acid may be recovered from the aqueous solution in any of several ways. One satisfactory manner of recovering it consists in evaporating the water under vacuum. To the resulting residue is added 150 grams of isopropanol and the mixture is warmed and stirred and then filtered hot to remove unreacted isonipecotic acid. Upon cooling, the filtrate yields crystals of N-(beta-hydroxypropyl)isonipecotic acid. These are isolated by filtration and dried. The N-(beta-hydroxypropyl)isonipecotic acid has a melting point of about 145° C.

EXAMPLE 8

*N-(4-hydroxybutyl)nipecotic acid*

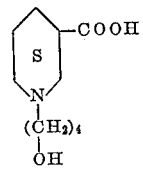

A solution of 151 grams of sodium nipecotate in 1,000 grams of water is placed into a three-liter flask equipped with a stirrer, a dropping funnel, and a reflux condenser. To this solution there is added 46 grams of caustic soda. While stirring, the solution is warmed to about 70° C. and 108 grams of 4-chloro-1-butanol is added gradually over a period of about one hour. When all of the 4-chloro-1-butanol has been added, the solution is heated under reflux conditions for about four hours. The solution is cooled, and the N-(4-hydroxybutyl)nipecotic acid formed during the reaction period is isolated in any convenient manner.

EXAMPLE 9

*N-(beta-hydroxypropyl)nipecotic acid*

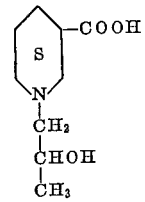

The procedure of Example 3 is repeated with the exception that 58 grams of propylene oxide is used in place of the 44 grams of ethylene oxide.

We claim as our invention:

1. N-hydroxyalkyl-piperidine carboxylic acids of the formula:

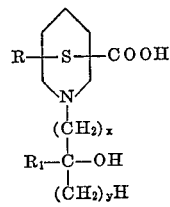

wherein R is a member of the group consisting of hydrogen, lower alkyl and carboxyl, $R_1$ is selected from the group consisting of hydrogen and lower alkyl, $x$ represents a whole number from 1 to 4 inclusive, and $y$ is selected from the group consisting of 0, 1, and 2.
2. N-(beta-hydroxyethyl)isonipecotic acid.
3. N-(beta-hydroxyethyl)nipecotic acid.
4. N-(beta-hydroxypropyl)isonipecotic acid.
5. N-(beta-hydroxypropyl)nipecotic acid.
6. N-(beta-hydroxyethyl)-6-methylnipecotic acid.

References Cited by the Examiner

Sperber et al., J. Chem. Soc., vol. 81, pp. 704–709 (1959).

Theilheimer, Synthetic Methods of Org. Chem., vol. 13, pages 182 and 183 (Reactions #359, 360 and 361) Karger, (Basel and N.Y.), (1959).

WALTER A. MODANCE, *Primary Examiner.*

AVROM D. SPEVACK, *Assistant Examiner.*